United States Patent [19]

Crawford et al.

[11] Patent Number: 4,788,831

[45] Date of Patent: Dec. 6, 1988

[54] METHOD AND APPARATUS FOR LOADING POULTRY CARCASSES INTO DRAG TYPE POSITIVE CONTROL CHILLER

[75] Inventors: David R. Crawford, Blue Springs; Frank J. Criscione, II, Kansas City, both of Mo.

[73] Assignee: Simon-Johnson, Inc., Kansas City, Mo.

[21] Appl. No.: 94,131

[22] Filed: Sep. 8, 1987

[51] Int. Cl.⁴ .............................................. F25D 17/02
[52] U.S. Cl. ........................................ 62/374; 62/63
[58] Field of Search .................. 62/63, 64, 374, 375, 62/380

[56] References Cited

U.S. PATENT DOCUMENTS

| | | | |
|---|---|---|---|
| 1,907,649 | 5/1933 | Marx | 62/63 |
| 2,372,373 | 3/1945 | Gilson | 62/63 |
| 2,637,066 | 5/1953 | Johnson | 17/11 |
| 2,779,052 | 1/1957 | Zebarth | 17/11 |
| 2,802,341 | 8/1957 | Polk | 62/63 |
| 2,884,233 | 4/1959 | Zebarth | 366/137 |
| 2,942,429 | 6/1960 | Van Dolah et al. | 62/64 |
| 3,006,774 | 10/1961 | Zebarth | 426/393 |
| 3,022,646 | 2/1962 | Zebarth | 62/381 |
| 3,043,319 | 7/1962 | Zebarth | 134/131 |
| 3,092,975 | 6/1963 | Zebarth | 62/63 |
| 3,240,026 | 3/1966 | Van Dolah et al. | 62/63 |
| 3,254,506 | 6/1966 | Braeking | 62/379 |
| 3,315,489 | 4/1967 | Zebarth et al. | 62/266 |
| 3,340,696 | 9/1967 | Zebarth et al. | 62/63 |
| 3,359,122 | 12/1967 | Zebarth et al. | 99/194 |
| 3,595,672 | 7/1971 | Bajcar et al. | 62/63 |
| 3,623,331 | 11/1971 | Buyens | 62/63 |
| 3,831,389 | 8/1974 | Lipona | 62/63 |
| 4,607,495 | 8/1986 | Fujimoto et al. | 62/63 |

OTHER PUBLICATIONS

Brochure titled Simon-Johnson Positive Control Chiller, Coded AP-AVM, 8/85.

Primary Examiner—Ronald C. Capossela
Attorney, Agent, or Firm—Hovey, Williams, Timmons & Collins

[57] ABSTRACT

A chiller has a series of moving rakes for advancing poultry carcasses through a tank of chilling liquid for cooling the carcasses down to an acceptable temperature. The chiller includes a loader which permits loading of the carcasses into an end of the tank without subsequent damages to the carcasses by the rakes. The loader includes a gate which is biased open for permitting feeding of the carcasses through an inlet and onto a ramp in the loading end of the tank when the rakes are remote from the inlet, and is closed as the rakes approach the inlet so as to prevent pinching of the carcasses between the rakes and the ramp.

13 Claims, 3 Drawing Sheets

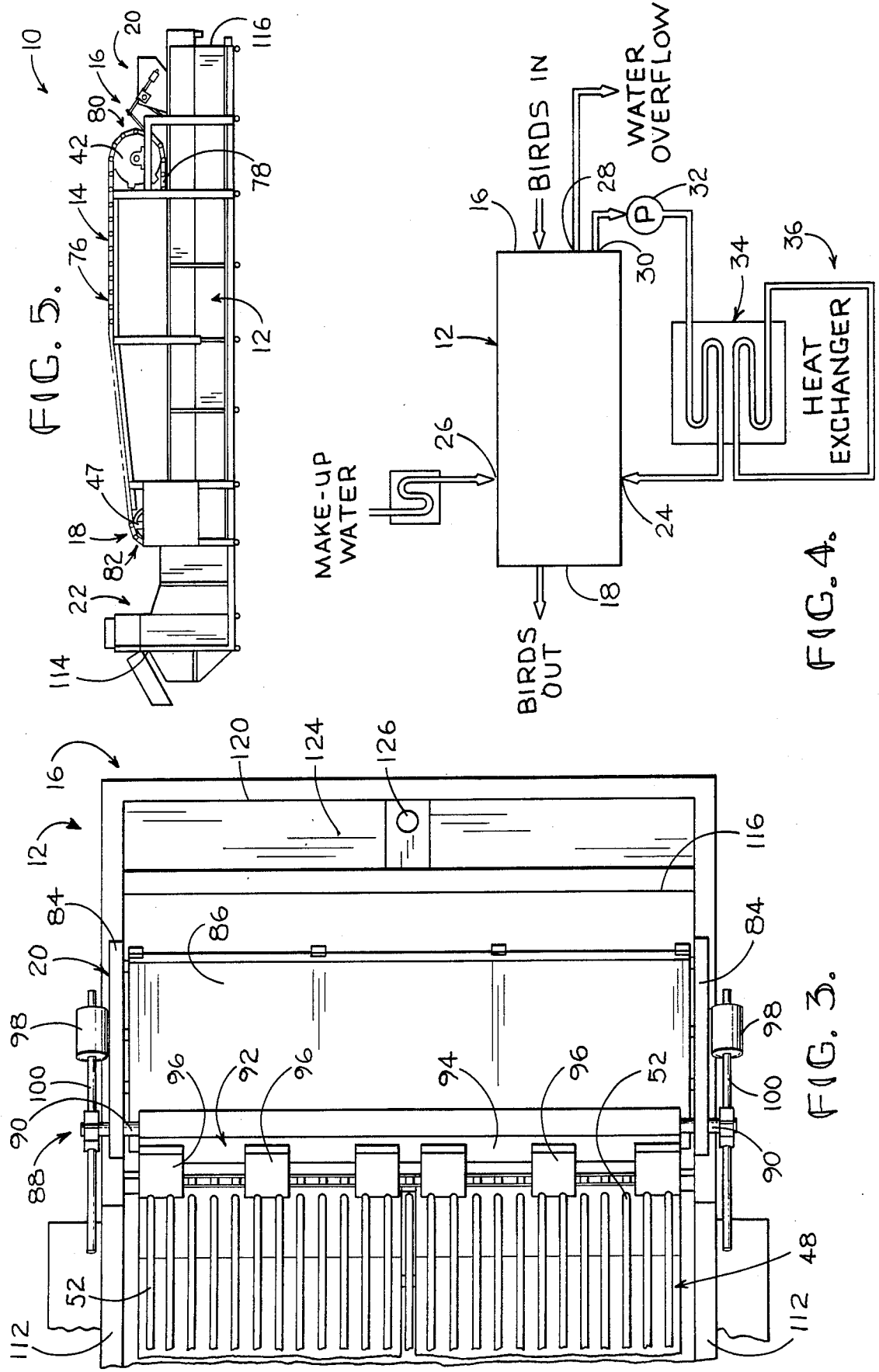

METHOD AND APPARATUS FOR LOADING POULTRY CARCASSES INTO DRAG TYPE POSITIVE CONTROL CHILLER

BACKGROUND OF THE INVENTION

1. Field of the Invention

This invention relates to the field of chillers for chilling poultry carcasses in a tank of cold liquid, and, more particularly, to loading devices for feeding poultry carcasses into an end of the chiller.

2. Background Art

In the processing of poultry carcasses, it is important after evisceration has taken place that the carcasses be rapidly cooled from body temperature to approximately 40° F. to meet government regulations regarding the processing of poultry. Continuous chillers heretofore manufactured and sold by the assignee of the present invention employ a tank in which poultry carcasses are moved countercurrent to a body of chilling liquid. Such chillers include a conveyor system having a series of spaced apart rakes which drag the carcasses from the downstream loading end of the tank to the upstream discharge end of the tank. Each rake, during its path of travel, swings arcuately down into the loading end of the tank to a vertical position at which point warm poultry carcasses are loaded from the side of the tank in front of the rake. The rake then moves down to the discharge end of the tank, dragging the carcasses therewith. The conveyor then lifts the rake out of the tank and returns it to the loading end of the tank. Each rake follows a substantially identical path, thereby providing a continuous movement of carcasses through the chilling liquid.

Side loading has been the preferred loading technique in conventional chillers primarily because past attempts at loading of the carcasses into an end of the tank at a location where the dragging rake is not vertical has resulted in damage to the carcasses. Carcass damage is usually due to pinching of the carcasses between the rakes and an inclined partition at the end of the tank as the rakes initially swing down into the tank.

Although side loaders have avoided the pinching problem by loading the birds in front of the corresponding dragging rake only after the rake has left the inclined partition and turned vertical, side loaders have had several shortcomings of their own, including inefficient use of the length of the chilling tank. Since side loaders load after the rake has swung into its vertical position, the carcasses are not loaded until the rakes have moved through a substantial portion of the tank, thereby resulting in the full length of the tank not being used during the chilling process. Furthermore, loading from the side sometimes tends to dump all the carcasses into a concentrated area adjacent the side of the tank, instead of distributing them evenly across the tank and throughout the liquid. This can result in inefficient chilling of the carcasses.

SUMMARY OF THE INVENTION

Accordingly, one important object of the present invention is to provide a chiller which retains the benefits of positive control, drag-type machines heretofore commercially offered by the assignee of the present invention, while at the same time securing the additional benefits associated with end loading of such machines. In this regard, an additional object of the present invention is to provide a chiller design which enables existing side-loading chillers in the field to be quickly and easily adapted for end loading by retrofitting such machines with special loaders constructed in accordance with the principles of the present invention.

Pursuant to the foregoing, the present invention contemplates using a loader which regulates loading of the carcasses onto the loading ramp in an end of the tank so that the carcasses are not damaged during interception and engagement thereof by the moving rakes. Furthermore, the loader of the present invention inherently loads across the width of the tank, thereby providing a relatively even distribution of poultry carcasses thereacross.

The loader prevents damage of the carcasses by the rake by selectively controlling the loading of carcasses into the tank so that as the rake is adjacent to the loading inlet and is approaching the ramp, the loading of carcasses is prevented, and when the rake is remote from the inlet, the loading of carcasses is permitted. To achieve this end, the loader has a gate which is normally biased open to permit gravitational feeding of the birds from an inlet of the loader and onto the ramp. The gate is pivotally mounted for permitting closure thereof by the rakes as the rakes approach the inlet, thereby preventing loading of the birds into the tank when the rakes are adjacent the inlet and approaching the ramp.

BRIEF DESCRIPTION OF THE DRAWINGS

FIG. 3 is a fragmentary, top plan view of the loading end of the chilling tank;

FIG. 4 is a schematic illustration of the chilling apparatus; and

FIG. 5 is a side elevational view of the chilling apparatus.

DESCRIPTION OF THE PREFERRED EMBODIMENT

Figure 1:
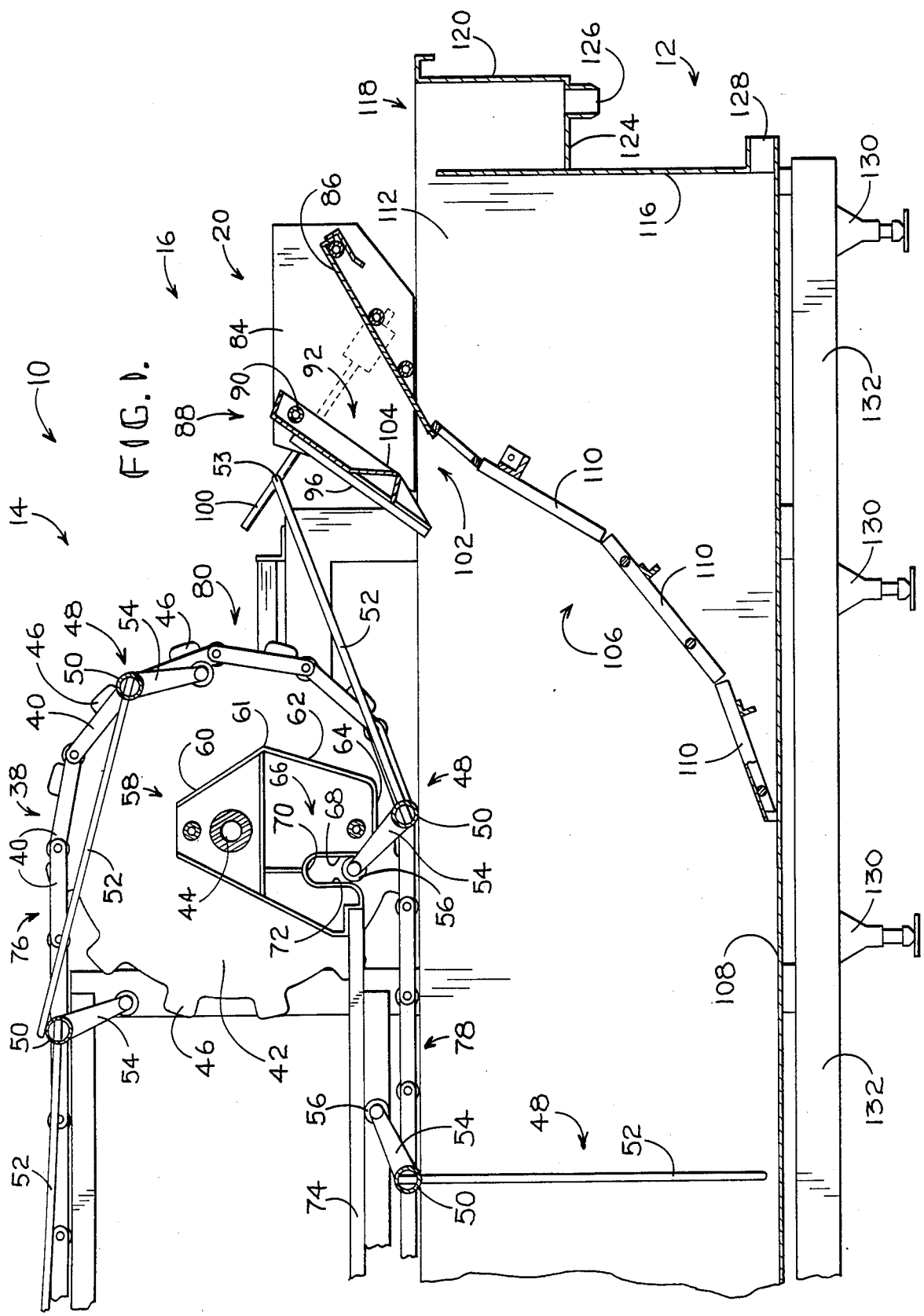
FIG. 1 is a fragmentary, vertical, longitudinal cross-sectional view of a loading end of a chilling tank constructed in accordance with the principles of the present invention, and showing a carcass loader having its gate biased in an open position.

Referring to FIG. 5, an apparatus 10 for use in chilling poultry carcasses (not shown) broadly includes an elongated, open-top chilling tank 12 adapted to contain a body of chilling liquid (not shown), a conveyor 14 disposed for moving the carcasses through the body of liquid from a downstream/loading end 16 of the tank 12 to an oppositely disposed upstream/discharge end 18 of the tank 12 so as to lower the muscle temperature of the carcasses, a loader 20 located at the loading end 16 of the tank 12 generally above the latter and adjacent the conveyor 14 for loading carcasses into the tank 12, and an unloader 22 located at the discharge end 18 of the tank 12 for discharging the chilled carcasses from the tank 12. The tank 12, conveyor 14 and unloader 22 correspond in structure and function to chilling machines heretofore commercialized by the assignee of the present invention, while loader 20 and its special operating relationships with the tank 12 and conveyor 14 are newly added in the context of the present invention.

As shown schematically in FIG. 4, the birds enter at the loading end 16 of the tank 12 and exit at the discharge end 18 of the tank 12. Chilling liquid such as cold water moves countercurrent to the direction of bird movement and enters the tank adjacent the upstream/discharge end 18 at either position 24 as chilled recycled liquid or at position 26 as chilled make-up water. The chilled liquid then flows downstream through the tank 12 and exists adjacent the loading end of the tank 12 at either position 28 as water overflow which is discarded as waste water along with floating grease and particles, or at position 30 as water for recycle. Recycled water exiting at position 30 enters pump 32 and is pumped through a cooling system 34, wherein the recycled water is cooled by giving off heat to a heat exchanger 36, such as a refrigeration unit.

Referring now to FIG. 1, the conveyor 14 includes a pair of laterally spaced apart endless drive chains 38 (only one being shown), each of which is made up of a series of end-to-end pivotally interconnected links 40. Each chain 38 is entrained around a corresponding idler wheel 42 (only one being shown) located adjacent the loading end 16 of the tank 12. The pair of idler wheels 42 are laterally spaced apart and are adjacent the lateral extremes of the tank 12. As each wheel 42 rotates about its axis 44, wheel teeth 46 are received by links 40 so as to force the chains 38 and, therefore, conveyor 14 through their prescribed paths of travel. A pair of laterally spaced apart drive wheels 47 (only one being shown, see FIG. 5) are located adjacent the discharge end 18 of the tank 12 and are entrained by corresponding ends of the chains 38.

Conveyor 14 further includes a series of longitudinally spaced apart rakes 48 movable in succession down into the tank 12 from above the latter at the loading end of the tank 12 prior to sweeping through the body of liquid toward the discharge end 18 of the tank 12. Each rake 48 includes a substantially horizontal, transverse, elongated pivot bar 50 mounted between the chains 38 for relative pivotal movement about its own longitudinal axis. A plurality of parallel rake fingers 52 extend outwardly from and are substantially perpendicular to each pivot bar 50. Each rake 48 also includes a pair of laterally spaced apart arms 54 (only one being shown) which are fixed to opposite ends of bar 50 and extend outwardly therefrom at an obtuse angle to the fingers 52. A cam follower 56 in the nature of a roller is pivotally attached to the outer distal end of each arm 54 for action upon by a corresponding cam 58 for moving the rake fingers 52 through a prescribed path of travel.

Each cam 58 is fixed in position adjacent a corresponding idler wheel 42 and has a number of surfaces which act upon the cam follower 56 so as to force the rake fingers 52 through their prescribed path of travel. For simplification, only one cam will be explained, but it will be understood that the pair of cams are substantially identical. In this respect, each cam surface includes an upper, downwardly and rearwardly inclined surface 60 which forms an apex 61 with a downwardly and forwardly inclined surface 62. The surface 62 extends to a lowermost, substantially horizontal, fore-and-aft extending surface 64 which extends forwardly to an inversely U-shaped cam section 66. The U-shaped section 66 includes a rear, vertical surface 68, a front, vertical surface 72, and an upwardly curved surface 70 interconnecting surfaces 68 and 72. At its lower extremity, the front surface 72 turns forwardly and leads to a substantially horizontal, fore-and-aft extending guide 74 which acts upon the followers 56 of the rakes 48 so as to maintain the fingers 52 in a substantially vertical orientation.

As illustrated in FIGS. 1 and 5, the conveyor 14 includes an upper, generally horizontal stretch of travel 76, a lower horizontal stretch of travel 78, a rear arcuate stretch of travel 80 interconnecting the two horizontal stretches 76,78, and a front arcuate stretch of travel 82 which also interconnects the upper and lower horizontal stretches 76,78.

As illustrated in FIG. 3, the loader 20 extends across the width of the tank 12 and includes a pair of laterally spaced apart, vertical support walls 84, a downwardly and forwardly extending slide 86 extending between the walls 84, and a gate assembly 88 at the front of the loader extending between the walls 84.

Figure 2:
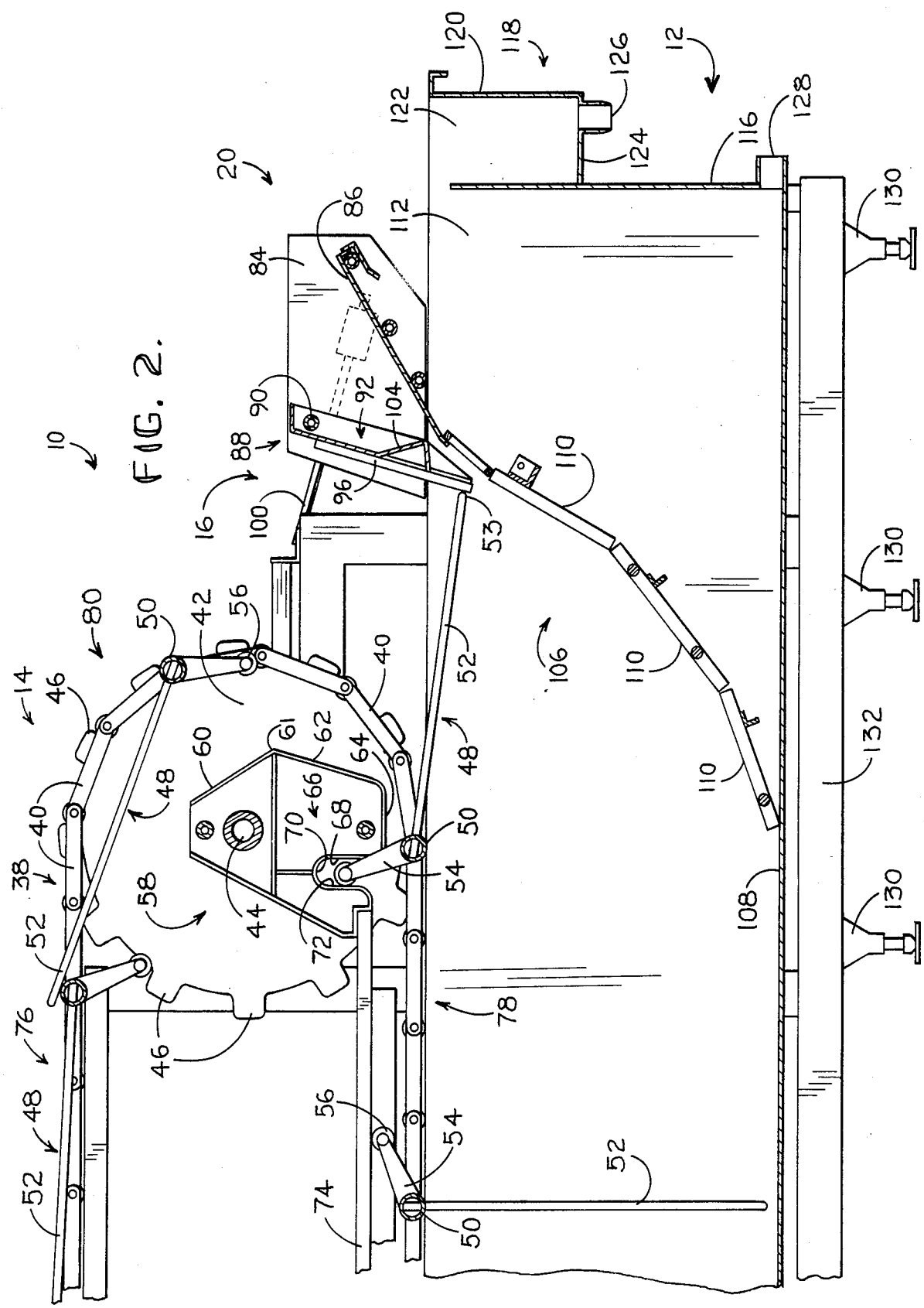
FIG. 2 is a fragmentary, vertical, longitudinal cross-sectional view of the loading end of the chilling tank showing the loader gate in a closed position.

The gate assembly 88 includes as its primary component a generally plate-like gate 92 which is fixed to a transverse shaft 90 journalled by walls 84. Gate 92 has a series of elongated, side-by-side nylon wear pads or strips 96 attached to that side thereof which faces the conveyor 14 (FIGS. 1 and 3). The gate assembly 88 also includes a pair of counterbalance weights 98 which are adjustably attached to the outer ends of a pair of rods 100 fixed to opposite ends of the shaft 90 in such a manner that weights 98 apply a torque about the axis of pivot shaft 90 and serve as means for biasing the gate 92 to an open equilibrium position. A throat or inlet 102 is presented between the gate 92 and the lower forwardmost end of the slide 86 when the gate 92 is in its opened position, as shown in FIG. 1. The gate 92 can be swung counterclockwise (as shown in FIG. 2) by the fingers 52 of each rake 48 so as to substantially narrow and effectively close the inlet 102 for a temporary period of time as each rake moves around the sprockets 42. A generally triangular in cross-section retaining element 104 spans the gate 92 on the rear face thereof to assist in closing off the inlet 102 when gate 92 is in its closed position. When the gate is in such closed position, a certain degree of spacing is present between the gate 92 and the slide 86 so as to prevent smashing of the carcasses while, at the same time, also prohibiting passage of carcasses through the inlet 102.

As illustrated in FIGS. 1, 2 and 3, the tank 12 includes a normally submerged, internal partition 106 which extends from the lower, frontmost end of the slide 86, downwardly and forwardly to a bottom wall 108 of the tank 12. The partition 106 includes several sections 110 which are coupled end-to-end and each of which extends transversely across the width of the tank 12 and is affixed thereto.

The partition 106 has existed on side-loading chillers previously commercialized by the assignee of the present invention and has heretofore been used to prevent carcasses loaded into such machines from being swept by the current of the chilling liquid into the far right-hand corner of the tank 12 (viewing FIGS. 1 and 2) and out of the reach of the downwardly and leftwardly moving rakes 48. In the context of the present invention, however, partition 106 serves not only as a barrier to prevent errant movement by the carcasses, but also as an entry ramp which the carcasses move along as they enter the tank from the loader 20. Thus, hereinafter the partition 106 will be referred to as the "ramp" 106.

The tank 12 further includes a pair of vertical, laterally spaced apart, fore-and-aft extending side walls 112 which extend upwardly from the bottom wall 108, a front end wall 114, and a rear end wall 116 which are spaced apart fore-and-aft and extend transversely between the side walls 112. The rear end wall 116 is slightly shorter than the side walls 112 and the front end wall 114 so as to permit the overflow of water, grease, and floating particulates into a weir 118 which is located rearwardly of and transversely along the rear end wall 116. The weir 118 has a back wall 120, a pair of laterally spaced apart side walls 122, and a bottom 124. A drain 126 extends downwardly from the weir bottom 124 for draining of the overflow therefrom.

Further details of the tank 12 include an outlet 128 at position 30 for providing liquid to pump 32 for recycle. Known in the art but not shown is a liquid inlet at position 24 for return of the cooled recycled liquid to the tank 12, and an inlet for entry of the make-up water into the tank 12 at position 26.

Feet 130 extend downwardly from a support structure 132 which underlies and supports the bottom of wall 108 of the tank 12.

OPERATION

In operation, when the gate 92 is open, as shown in FIG. 1, the poultry carcasses are delivered to the slide 86 from other equipment (not shown) by a conveyor belt (not shown) or the like. Poultry carcasses entering into the loader 20 land on the slide 86 and gravitationally slide downwardly and forwardly between the slide and the gate 92 through the inlet 102 and onto the entry ramp 106. The carcasses then move gravitationally downward and forward along the ramp 106 until they are engaged from behind by rake fingers 52 and advanced longitudinally through the tank from the loading end 16 of tank 12 to the discharge end 18 of tank 12. Once the carcasses have been dragged to the discharge end 18, the unloader 22 will then remove the chilled carcasses from the tank 12.

As each rake 48 moves through its lower stretch of travel 78, a rearward force is applied to the fingers 52 by the dragged carcasses, but the fingers 52 are held in a vertical position by a counteracting downward force exerted by the guide 74 upon the cam follower 66.

Once the rake 48 is adjacent to the discharge end of the tank 12, the rake moves upwardly about its front arcuate stretch of travel 82 and is no longer acted upon by the guide 74, thereby permitting the rake 48 to gravitationally pivot freely about the pivot bar 50. As the rake 48 is moved upwardly to its upper stretch of travel 76, the fingers 52 are encountered by the next adjacent trailing bar 50 and ride thereon during the upper horizontal stretch of travel 76.

The rake fingers 52 continue to ride on the next adjacent trailing bar 50 until the rake is moved through a substantial portion of its rear arcuate stretch of travel 80 at the loading end of tank 12 wherein the fingers 52 engage the surface 60 and then apex 61, which slidably apply rearward force to the fingers 52. Once the bar 50 has been moved forward of and beneath the apex 61, the fingers 52 will gravitationally fall clockwise about the axis of bar 50 until cam follower 56 engages lowermost horizontal surface 64 of cam 58. Further forward movement of the horizontal rake bar 50 results in forward movement of the cam follower 56 along surface 64 and entry of cam follower 56 into inversely U-shaped cam section 66, which results in further pivoting of the fingers 52 clockwise about the axis of bar 50 until the outermost ends of the fingers 53 engage the nylon pads 96 of gate 92. Further advancement of the conveyor forces the roller 56 forward against forward vertical surface 72 and forces fingers 52 to pivot about the axis of bar 50, thereby causing the outermost end 53 of fingers 52 to force the gate 92 downwardly and counterclockwise (as viewed in FIGS. 1 and 2) about the axis of pivot shaft 90, thereby overcoming the urging of the yieldable biasing means and bringing the retaining element 104 closer to the slide 86 to effectively close the inlet 102. The retaining element 104 and the slide 86 are, however, sufficiently spaced apart to prevent damage to the carcasses.

By closing the inlet 102 as the fingers approach the same, whereby to temporarily prevent carcass loading, pinching of carcasses between the fingers 52 and the ramp 106 is prevented. Otherwise, the close proximity of the tips of rake teeth 52 to the ramp 106 during entry of the rakes 48 into the tank could lead to feeding and damage problems.

Further movement of the pivot bar 50 forwardly along its lower horizontal stretch of travel 78 results in the fingers 52 sliding off the nylon pads 96 and moving beyond the inlet 102, thereby permitting the gate to swing upwardly in a clockwise direction to its biased open position so that loading of carcasses into the tank 12 may resume.

As the bar 50 moves forwardly, the fingers 52 swing clockwise causing the outermost end 53 to sweep closely downwardly and forwardly along the ramp 106 and thence toward the discharge end of the tank 12 as the rakes intercept the carcasses. Further forward movement of the pivot bar 50 causes the cam follower 56 to roll down off the forward vertical surface 72 and engage the guide 74 which applies downward force upon the cam follower 56, thereby countering any force caused by the dragged carcasses and resulting in the fingers 52 remaining substantially vertical during the lower horizontal stretch of travel of the rake 48.

It should thus be apparent from the foregoing that the present invention provides a significant advancement in the art without major overhaul and redesign of existing poultry processing systems, including the chilling machines forming a part of such systems. The basic chiller with its pumping and refrigerating apparatus and its drag-type, positive control conveyor can remain totally unchanged. It is only necessary to reorient the carcass supply conveyor so that now such carcasses are fed axially or end-wise to the machine rather than transversely or from the side, and to install the loader 20 in its proper position relative to the conveyor 14. No additional motors, pumps, conveyors or other moving mechanisms need be added.

On the other hand, a completely new chiller-plus-loader apparatus can be fabricated and made available to poultry processors. In either case, the benefits associated with end loading of such positive control, drag-type chillers can be obtained without the drawbacks heretofore prevailing in side-loading systems.

It will be appreciated that the foregoing discloses only a single, exemplary embodiment of the present invention and that obvious modifications and improvements to the present invention could be made by those skilled in the art without departing from the spirit and gist of the present invention. Accordingly, the claims which follow should not be limited to the specific construction shown and described herein, but should also encompass all obvious modifications and improvements thereof.

We claim

1. In apparatus for use in chilling poultry carcasses, the improvement comprising:

a chilling tank adapted to contain a body of chilling liquid;

a conveyor disposed for engaging carcasses delivered to the tank and for advancing the same through the body of liquid to lower the muscle temperature of the carcasses, said conveyor including a series of spaced rakes movable in succession down into the tank from above the latter at a loading end of the tank prior to sweeping through the body of liquid toward a discharge end of the tank; and a loader at said loading end of the tank generally above the latter and having an inlet adjacent the conveyor for admitting carcasses into the tank in such a manner that the carcasses are intercepted by the moving rakes and advanced toward the opposite end of the tank, said loader including a gate operable to temporarily close said inlet as each rake moves into the vicinity of the inlet and to reopen the inlet as the rake moves beyond the inlet.

2. In chilling apparatus as claimed in claim 1, wherein said gate is disposed for operation by said conveyor.

3. In chilling apparatus as claimed in claim 2, wherein said gate includes means yieldably biasing the same toward an open position, said conveyor being operable to overcome the urging of said yieldable biasing means during closing of the gate.

4. In chilling apparatus as claimed in claim 3 wherein each of said rakes is provided with an outermost end disposed for engaging the gate and closing the same as the rakes successively move into the vicinity of the inlet.

5. In chilling apparatus as claimed in claim 3, wherein said yieldable biasing means includes a weight.

6. In chilling apparatus as claimed in claim 1, wherein said tank is provided with a normally submerged, carcass entry ramp leading downwardly from the inlet of the loader and generally forwardly with respect to the direction of advancement of the carcasses through the tank for guiding carcasses into the tank when the inlet is open, said rakes of the conveyor being operable to sweep along said ramp and thence toward the discharge end of the tank as the rakes intercept the carcasses.

7. In chilling apparatus as claimed in claim 6, wherein each of said rakes is provided with an outermost end disposed for engaging and closing the gate as the rakes move successively into the vicinity of the inlet.

8. In apparatus for use in chilling poultry carcasses, the improvement comprising:

an elongated, open-top chilling tank adapted to contain a body of chilling liquid and having oppositely disposed, loading and discharge ends respectively;

an endless conveyor positioned above said tank and having a series of spaced rakes associated therewith which move during operation along a pair of vertically spaced, upper and lower, generally horizontal stretches of travel and a pair of horizontally spaced, arcuate stretches of travel at opposite ends of the horizontal stretches, said rakes being operable during movement along one of said arcuate stretches to enter the tank from above the latter for subsequent movement longitudinally through the tank along the lower horizontal stretch of travel of the rakes;

a normally submerged, carcass entry ramp adjacent the loading end of the tank leading downwardly from the open top of the tank and forwardly with respect to the normal direction of travel of carcasses through the tank, said ramp being disposed to cause the rakes to sweep downwardly and forwardly along the ramp in close proximity thereto as the rakes move along their one arcuate stretch of travel and enter their lower horizontal stretch of travel; and a loader at said loading end of the tank generally above the latter and having an inlet positioned adjacent the conveyor to admit carcasses into the tank along said ramp for interception by the moving rakes and advancement toward the discharge end of the tank, said loader including a normally open gate at said inlet operable in timed relationship with the conveyor for temporarily closing the inlet during each successive movement of a rake around its one arcuate stretch of travel into the vicinity of the inlet and for reopening the inlet as the rake moves beyond the inlet into its lower horizontal stretch of travel, whereby to permit loading of the carcasses into the tank from the loading end thereof generally in the direction of longitudinal advancement of the carcasses through the tank without damaging the carcases during interception and engagement thereof by the moving rakes.

9. In chilling apparatus as claimed in claim 8, wherein said gate is provided with means for yieldably biasing the same toward an open position.

10. In chilling apparatus as claimed in claim 9, wherein said rakes are disposed to engage and shift the gate into a position closing the inlet against the biasing force of said yieldable biasing means as the rakes move successively into the vicinity of the inlet, said rakes being disposed to disengage from the gate and allow the biasing means to return the gate to its open position as the rakes move successively beyond the inlet.

11. In chilling apparatus as claimed in claim 9, wherein said yieldable biasing means includes a counterbalance weight disposed to urge the gate toward its open position.

12. In chilling apparatus as claimed in claim 11, wherein said gate is pivotally mounted for swinging movement between its open and closed position.

13. In chilling apparatus as claimed in claim 8, wherein said tank is provided with an end wall at said loading end of the tank spaced rearwardly from said ramp with respect to the normal direction of advancement of carcasses through the tank.

* * * * *